United States Patent
Kimura (10) Patent No.: US 7,345,775 B2
(45) Date of Patent: Mar. 18, 2008

(54) IMAGE PROCESSING APPARATUS, PRINTING SYSTEM, IMAGE DATA FORMAT SELECTING METHOD, PROGRAM AND STORAGE MEDIUM

(75) Inventor: Shunpei Kimura, Kanagawa (JP)

(73) Assignee: Canon Kabushiki Kaisha (JP)

( * ) Notice: Subject to any disclaimer, the term of this patent is extended or adjusted under 35 U.S.C. 154(b) by 974 days.

(21) Appl. No.: 10/371,171

(22) Filed: Feb. 20, 2003

(65) Prior Publication Data

US 2003/0179389 A1  Sep. 25, 2003

(30) Foreign Application Priority Data

Feb. 20, 2002  (JP) ............... 2002-042917

(51) Int. Cl.
*G06F 3/12* (2006.01)
*G06F 15/00* (2006.01)

(52) U.S. Cl. ..................... 358/1.13; 358/1.9

(58) Field of Classification Search ........ 358/1.1–1.18, 358/523, 527, 528, 3.12
See application file for complete search history.

(56) References Cited

U.S. PATENT DOCUMENTS 6,380,975 B1  4/2002  Suzuki
6,808,244 B2 *  10/2004  Rosenberger et al. ......... 347/15
6,891,888 B2 *  5/2005  Enomoto et al. ...... 375/240.01

FOREIGN PATENT DOCUMENTS

| EP | 0 883 276 A2 | 12/1998 |
|----|--------------|---------|
| JP | 08-032911 A | 2/1996 |
| JP | 09-139876 A | 5/1997 |
| JP | 10-341327 A | 12/1998 |
| JP | 2001-136432 A | 5/2001 |

* cited by examiner

*Primary Examiner*—Douglas Q. Tran
(74) *Attorney, Agent, or Firm*—Rossi, Kimms & McDowell LLP (57) ABSTRACT

There is provided an image processing apparatus which can effectively use a memory provided in an image pickup apparatus such as a digital camera or a digital video camera, without causing a shortage of the working memory capacity during image processing of print data, to realize a printing system that has minimized costs and is very flexible. Image data stored in a recording medium is input to the image processing apparatus. An image data format for conversion of the image data is selected according to a size in which the input image data is to be printed out and the input image data is processed in the selected image data format.

14 Claims, 11 Drawing Sheets

| YUV FORMAT \ PRINT SIZE | CARD | L | A6 |
|---|---|---|---|
| AFTER PRIMARY RESIZING | 4:2:2 | 4:2:2 | 4:1:1 |
| AFTER SECONDARY RESIZING | 4:2:2 | 4:1:1 | 4:1:1 |

CARD SIZE : 1040 × 662 = 688.480 Kbyte
L SIZE       : 1456 × 1100 = 1601.600 Kbyte
A6 SIZE     : 1808 × 1232 = 2227.456 Kbyte

*FIG. 6A*

READ JPG FILE INTO RAM

*FIG. 6B*

JPG EXPANSION & PRIMARY RESIZING

*FIG. 6C*

SECONDARY RESIZING & SHARPNESS

*FIG. 6D*

YUV → Y/M/C COLOR CONVERSION

YUV 4:2:2

| 7 | Y3 | 0 | 7 | V1 | 0 |
| 7 | Y2 | 0 | 7 | U1 | 0 |
| 7 | Y1 | 0 | 7 | V0 | 0 |
| 7 | Y0 | 0 | 7 | U0 | 0 |

• REPRESENT 4 PIXELS BY 4 WORDS

※ DATA AMOUNT OF YUV 4:1:1 IS AS SMALL AS 3/4 OF DATA AMOUNT OF YUV 4:2:2

FIG. 7B

YUV 4:1:1

| 7 | Y3 | 0 | 7 | Y2 | 0 |
| 7 | Y1 | 0 | 7 | V0 | 0 |
| 7 | Y0 | 0 | 7 | U0 | 0 |

• REPRESENT 4 PIXELS BY 3 WORDS

※ DATA AMOUNT OF YUV 4:1:1 IS AS SMALL AS 3/4 OF DATA AMOUNT OF YUV 4:2:2

FIG. 8

| YUV FORMAT \ PRINT SIZE | CARD | L | A6 |
|---|---|---|---|
| AFTER PRIMARY RESIZING | 4:2:2 | 4:2:2 | 4:1:1 |
| AFTER SECONDARY RESIZING | 4:2:2 | 4:1:1 | 4:1:1 |

IMAGE PROCESSING APPARATUS, PRINTING SYSTEM, IMAGE DATA FORMAT SELECTING METHOD, PROGRAM AND STORAGE MEDIUM

BACKGROUND OF THE INVENTION

1. Field of the Invention

The present invention relates to an image processing apparatus, a printing system, an image data format selecting method, a program, and a storage medium, and particularly relates to an image processing apparatus, a printing system, and an image data format selecting method that are suitable for applying to storing in a recording medium electronic information of images picked-up by a digital still camera that records static images, a digital video camera, or the like and printing out the electronic information by a printer through the recording medium, and a program for implementing the method, and a storage medium storing the program.

2. Description of the Related Art

Conventionally, some thermal transfer line printers use thermo-sensitive paper sheets as print sheets, selectively drive a plurality of heating elements arranged in the main scanning direction, and feed the sheets in the subscanning direction to print images in dot lines on the sheets.

In recent years, with the advancement of input devices, as the image input side, which handle images, such as digital cameras, digital video cameras, and scanners, thermal transfer printers as printing units have also come to be focused on. This is because, while inkjet printers only allow a digital choice as to whether to eject liquid drips and eject small liquid drips to sheets to obtain apparent resolution and gradation by a method such as error diffusion, thermal transfer printers can easily change the value of controllable heat for a single pixel, which makes it possible to obtain various graduations for a single pixel so that images which are smoother and with higher image quality compared to inkjet printers can be obtained. Further, with the improvement of the performance of thermal heads of thermal transfer printers and the performance of sheet materials, image prints which look as good as silver-salt photographs in finished quality have come to be obtainable. Consequently, thermal transfer printers have come to be focused on particularly as printers for natural images with the advancement of recent digital cameras.

Therefore, there have been proposed systems in which a printer device, as described above, and an image pickup apparatus such as a digital camera or a digital video camera are directly connected to each other or constructed in one body, whereby image information of picked-up images is printed not through an apparatus such as a computer that processes image information.

A printing system that directly connects a digital camera and a printer device will be described in detail. Images picked up by the digital camera are once stored in a recording medium provided in the digital camera. To print out the images from the printer device, a user directly connects the digital camera and the printer with a dedicated cable. Then, the user displays the images stored in the recording medium on a display unit of the digital camera and selects an image that the user intends to print. Needless to say, on this occasion, an operating element provided in the digital camera is used to select the image. When the user has selected the image to be printed, the user pushes a print key, which is allocated to the operating element of the digital camera. Thus, image processing for prints is performed in the digital camera. When image processing in the digital camera has been completed, data for printing is transmitted to the printer device, and then the printer device prints out the received data for printing.

In the above-described printing system, the user only needs to operate the operating element of the digital camera a few times to print out the data by the printer device, which facilitates photographic printing and is greatly convenient.

Due to intended applications of digital cameras, digital camera generally have a JPG chip for compressing the data of picked-up images into a JPG (Joint Photographic Experts Group) file or expanding the JPG file into image data to reproduce the same, and an IC chip having a resizing function of adjusting picked-up images data to desired sizes. Effective use of the hardware resources of the digital camera to generate print data not only greatly shortens the processing time compared to the case of implementing the JPG expansion and the resizing function by software processing, but also enables forming resources required of the entire printing system of a minimum number of resources, which results in lower costs.

However, the above-described prior art has the following problem. The implementation of image processing of print data in the inside of the digital camera as in the printing system of the above-described prior art has an advantage of effective utilization of hardware blocks suitable for image processing for generating print data, but it has also a disadvantage that the implementation is restricted by other hardware blocks included in the digital camera. Specifically, image processing for generating print data must be performed within a limited size of a working memory provided in the digital camera, which causes shortage of the working memory capacity in the digital camera when the size of print data is large.

SUMMARY OF THE INVENTION

It is an object of the present invention to provide an image processing apparatus, and a printing system, an image data format selecting method which can solve the above-described problem, and can effectively use a memory provided in an image pickup apparatus such as a digital camera or a digital video camera, without causing a shortage of the working memory capacity during image processing of print data, to realize a printing system that has minimized costs and is very flexible, and a program for implementing the image data format selecting method and a storage medium storing the program.

To attain the above object, in a first aspect of the present invention, there is provided an image processing apparatus comprising a storage medium, an input device that inputs image data stored in the storage medium, and an image processing device that selects an image data format of the image data to be converted according to a size in which the input image data is to be printed out and processes the input image data in the selected image data format.

Preferably, in the first aspect, the image data format comprises a first image data format and a second image data format requiring a data amount smaller than a data amount of the first image data format, and the image processing device selects the first image data format when a first printout image size is selected, and selects the second image data format when a second printout image size is selected.

Preferably, in the first aspect, the first image data format has a ratio (Y:U:V) between a luminance data amount (Y) and color difference data amounts (U, V) of 4:2:2, and the second image data format has a ratio (Y:U:V) of 4:1:1.

Preferably, in the first aspect, further comprising an image pickup apparatus that picks up an image of an object.

Preferably, in the first aspect, further comprising a printer device that prints an image based on the image data processed by the image processing device.

To attain the above object, in a second aspect of the present invention, there is provided an image processing method comprising an input step of inputting image data stored in a recording medium, and an image processing step of selecting an image data format of the image data to be converted according to a size in which the input image data is to be printed out and processing the input image data in the selected image data format.

Preferably, in the second aspect, the image data format comprises a first image data format and a second image data format requiring a data amount smaller than a data amount of the first image data format, and the first image data format is selected when a first printout image size is selected, and the second image data format is selected when a second printout image size is selected.

Preferably, in the second aspect, the first image data format has a ratio (Y:U:V) between a luminance data amount (Y) and color difference data amounts (U, V) of 4:2:2, and the second image data format has a ratio (Y:U:V) of 4:1:1.

To attain the above object, in a third aspect of the present invention, there is provided a program for causing a computer to execute an image processing method comprising an input step of inputting image data stored in a recording medium, and an image processing step of selecting an image data format of the image data to be converted according to a size in which the input image data is to be printed out and processing the input image data in the selected image data format.

Preferably, in the third aspect, the image data format comprises a first image data format and a second image data format requiring a data amount smaller than a data amount of the first image data format, and the image processing device selects the first image data format when a first printout image size is selected, and selects the second image data format when a second printout image size is selected.

Preferably, in the third aspect, the first image data format has a ratio (Y:U:V) between a luminance data amount (Y) and color difference data amounts (U, V) of 4:2:2, and the second image data format has a ratio (Y:U:V) of 4:1:1.

To attain the above object, in a fourth aspect of the present invention, there is provided a storage medium storing a program for causing a computer to execute an image processing method comprising an input step of inputting image data stored in a recording medium, and an image processing step of selecting an image data format of the image data to be converted according to a size in which the input image data is to be printed out and processing the input image data in the selected image data format.

The above and other objects, features and advantages of the invention will become more apparent from the following detailed description taken in conjunction with the accompanying drawings.

BRIEF DESCRIPTION OF THE DRAWINGS

FIGS. 1A and 1B show a printing system composed of a digital camera and a sublimation printer according to a first embodiment of the present invention, wherein

FIGS. 2A and 2B are schematic diagrams of a sublimation thermal transfer system according to the first embodiment, wherein

FIGS. 4A to 4C are diagrams showing print patterns according to the first embodiment, wherein

FIGS. 11A and 11B show a digital camera having an incorporated sublimation printer according to a second embodiment of the present invention, wherein

DETAILED DESCRIPTION OF THE PREFERRED EMBODIMENTS

The present invention will be described below in detail with reference to the accompanying drawings.

Figure 1A:
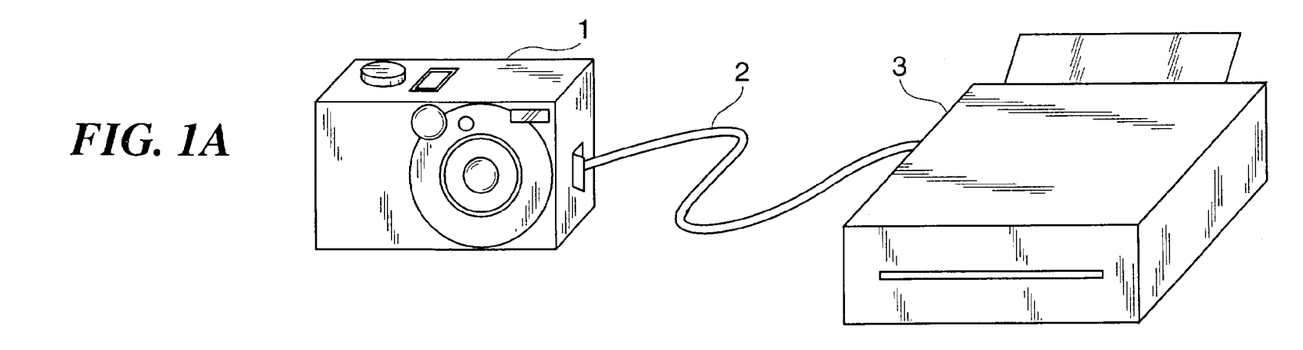
FIG. 1A is a perspective view showing the appearance of the digital camera and the sublimation printer.
Figure 1B:
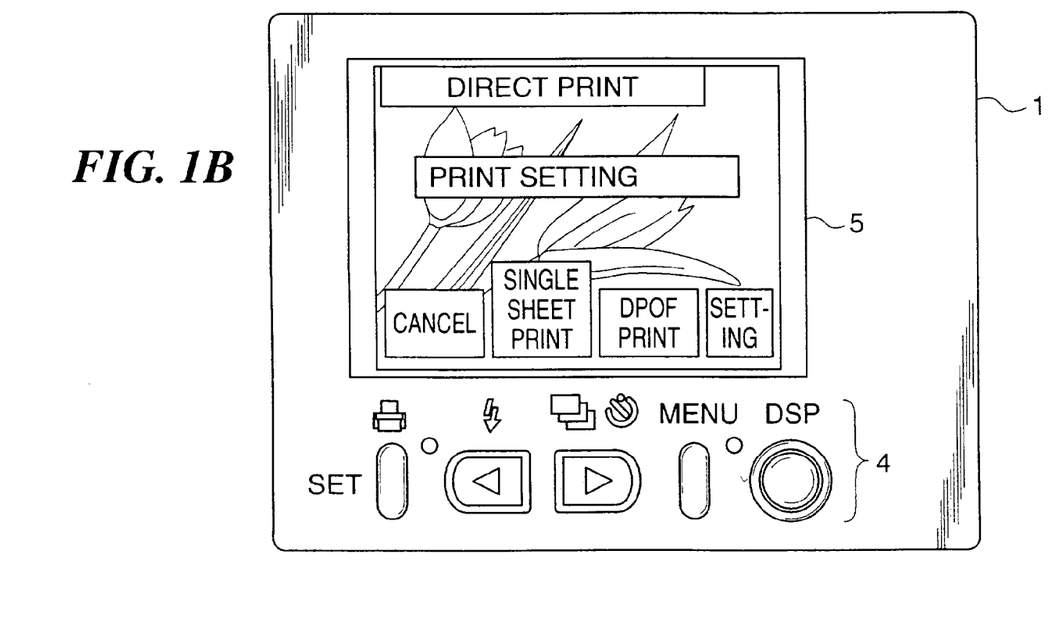
FIG. 1B is a diagram showing a liquid crystal screen and operating elements of the digital camera.

FIG. 1A is a perspective view showing the appearance of a printing system according to a first embodiment of the present invention. FIG. 1B is a diagram showing a rear panel of a digital camera 1. The printing system is comprised of the digital camera 1 provided with operating elements 4 and a liquid crystal display screen 5, and a sublimation thermal transfer printer (hereinafter referred to as "the sublimation printer") 3, the digital camera 1 and the sublimation printer 3 being connected together with a dedicated cable 2. In the present embodiment, static images, which are picked up by the digital camera 1, then stored in a recording medium such as a memory, and read out from the recording medium, are subjected to image processing in the digital camera 1 to be converted into print data suitable for printing by the sublimation printer 3, and then the print data is transmitted to the sublimation printer 3 through the dedicated cable 2 in the order of yellow, magenta, and cyan to be printed in colors.

A user can select a print pattern (a print mode), a printer type, an image to be printed, a print frame size, the number of prints, and so on by operating elements 4 of the digital camera 1, and confirm the selected contents by the liquid crystal display screen 5 of the digital camera 1.

Figure 2A:
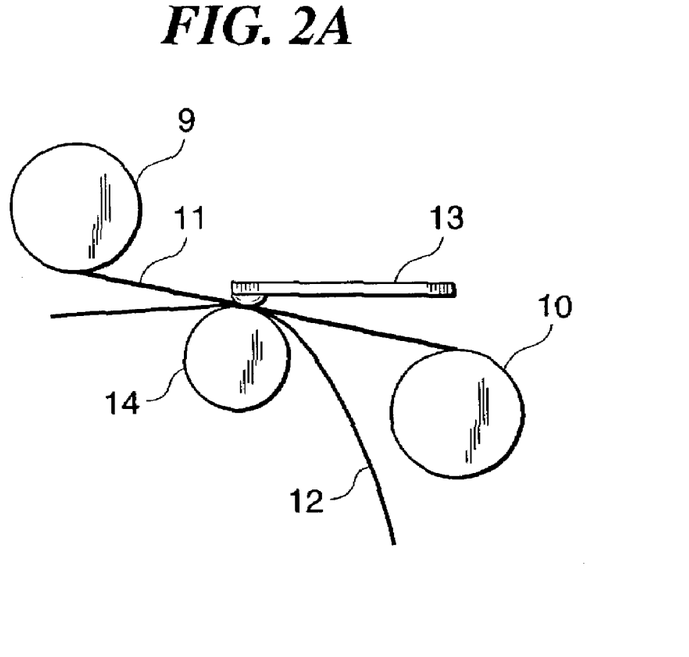
FIG. 2A is a schematic diagram showing the construction of a sublimation thermal transfer mechanism.
Figure 2B:
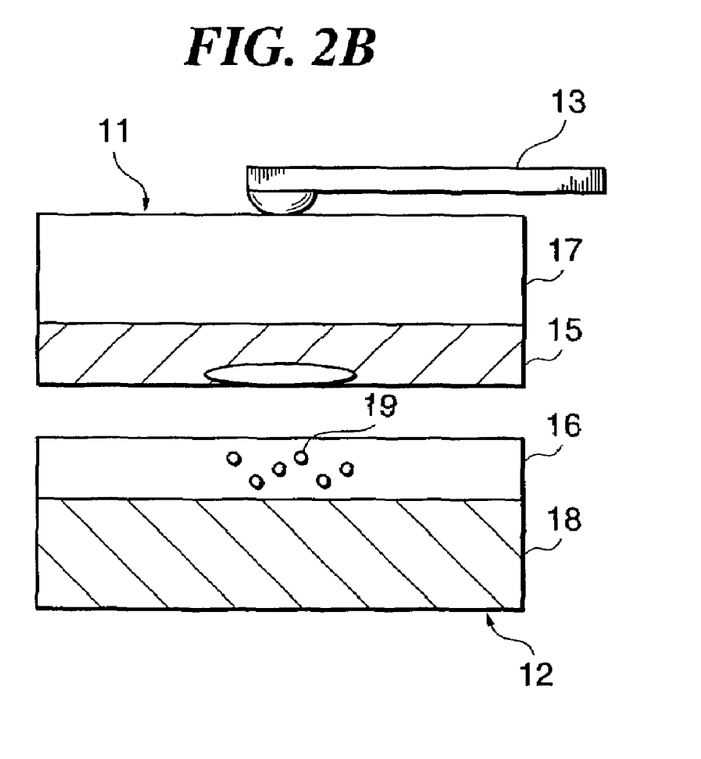
FIG. 2B is a schematic diagram showing an ink sheet and a dedicated print sheet.

FIGS. 2A and 2B are schematic diagrams useful in explaining the basic principle of a sublimation thermal transfer system, which is an image recording system employed by the present embodiment and applied to the sublimation printer 3 according to the present embodiment.

The sublimation thermal transfer system utilizes a diffusion phenomenon of dyes (pigments). In FIGS. 2A and 2B, an ink sheet 11 composed of a plastic sheet with dyes of three colors (yellow, magenta, and cyan) applied thereon is comprised of a sublimation dye 15, and a base 17. A dedicated print sheet 12 is comprised of a receiving layer 16 having dye molecules 19 therein, and a base 18. The ink sheet 11 is superimposed with the dedicated print sheet 12, and the superimposed sheets 11, 12 are sandwiched between a thermal head 13 and a platen roller 14. The ink sheet 11 is sublimated or thermally diffused over the dedicated print sheet 12 by the heat of the thermal head 13 to obtain a color print.

In the dedicated print sheet 12, the receiving layer 16 containing polyester resin as a principal component is applied to the base 18 to secure coloring of the sublimation dye 15 of the ink sheet 11. Gradation can be given by controlling the heat supplied to the thermal head 13. Specifically, gradation is given to each of the three colors (yellow. magenta, and cyan), printing is carried out at the same place of the dedicated print sheet 12, and thus a high-definition full-color print in units of one pixel is realized. In FIG. 2A, reference numerals 9 and 10 are elements that constitute a feed-out/convey/take-up mechanism for the ink sheet 11.

Figure 3:
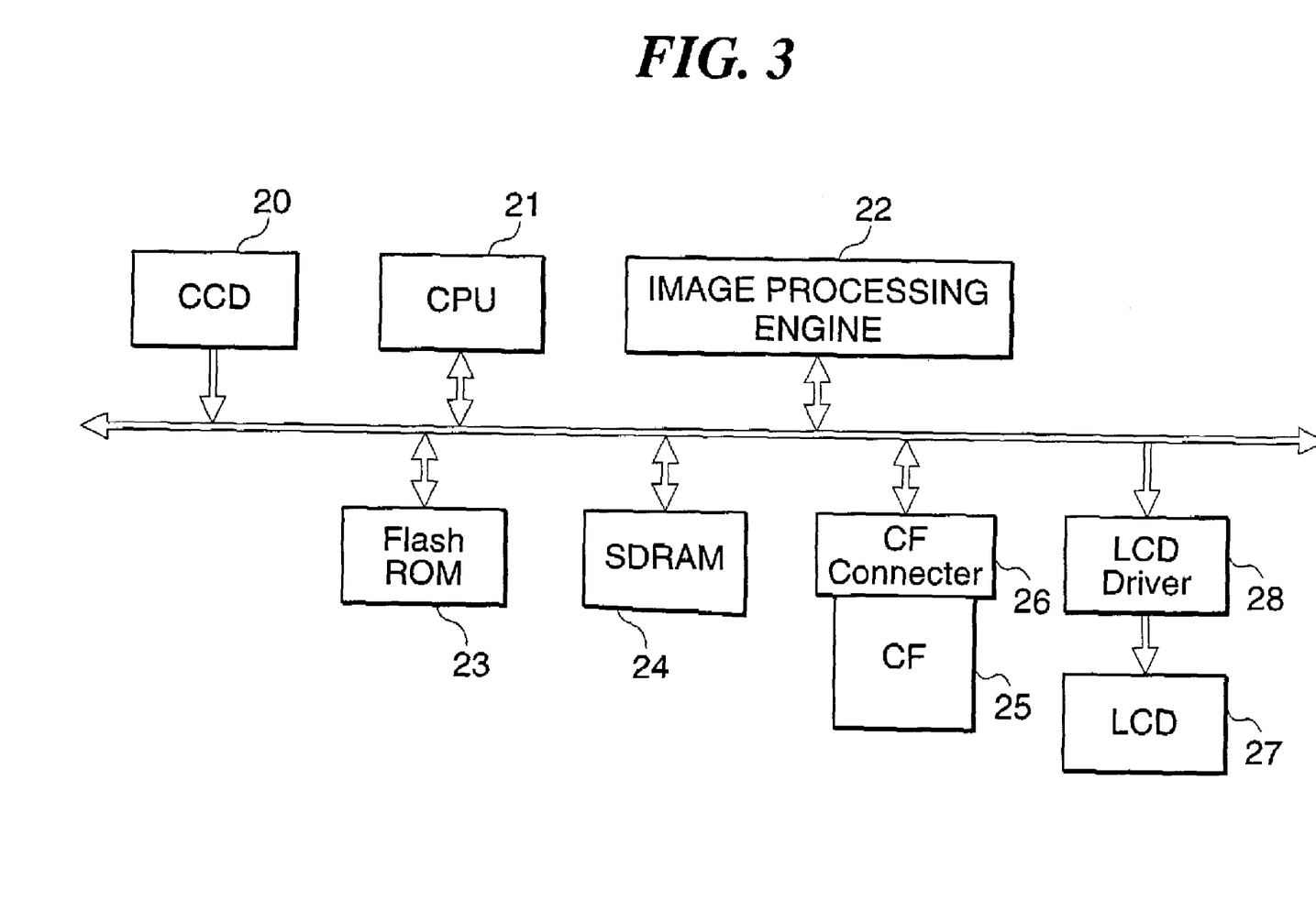
FIG. 3 is a block diagram showing the construction of the digital camera according to the first embodiment.

FIG. 3 is a block diagram showing the construction of the digital camera 1, which functions as an image processing section that generates print data according to the present embodiment. The digital camera 1 is comprised of a CCD 20, a CPU 21, an image processing engine 22, a flash ROM 23, an SDRAM 24, a CF (Compact Flash (registered trademark) Memory) 25, a CF connector 26, an LCD 27, and an LCD driver 28.

The CCD 20 is a photoelectric conversion device that converts an image formed through a lens, not shown, into an electric signal. The CPU 21 is a central processing unit that controls the digital camera system and performs calculations. The image processing engine 22 processes the electric signal transmitted from the CCD 20. The flash ROM 23 is a memory that stores a program for controlling the digital camera. The SDRAM 24 is a memory that temporarily stores image data and is used in data processing. The CF 25 is a detachable memory that stores an image data file. The CF connector 26 is for attaching the CF 25 to the digital camera. The LCD 27 is a display that displays the image picked up by the digital camera, a menu for operating the digital camera, and the like. The LCD driver 28 drives the LCD 27.

Figure 4A:
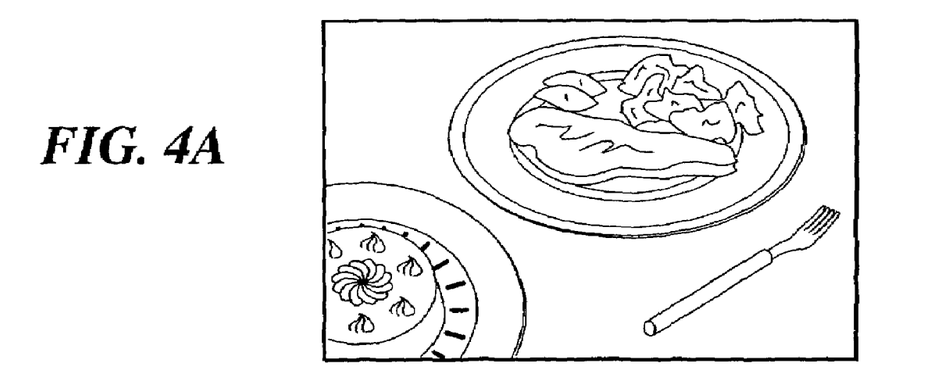
FIG. 4A shows an edgeless print pattern.
Figure 4B:
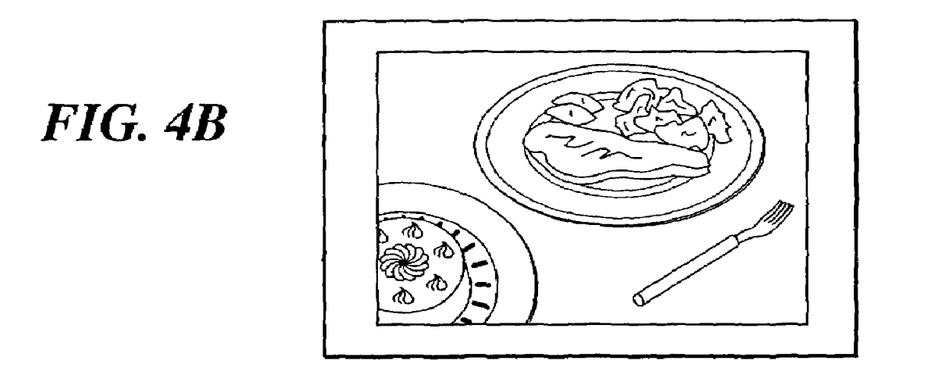
FIG. 4B shows an edged print pattern.
Figure 4C:
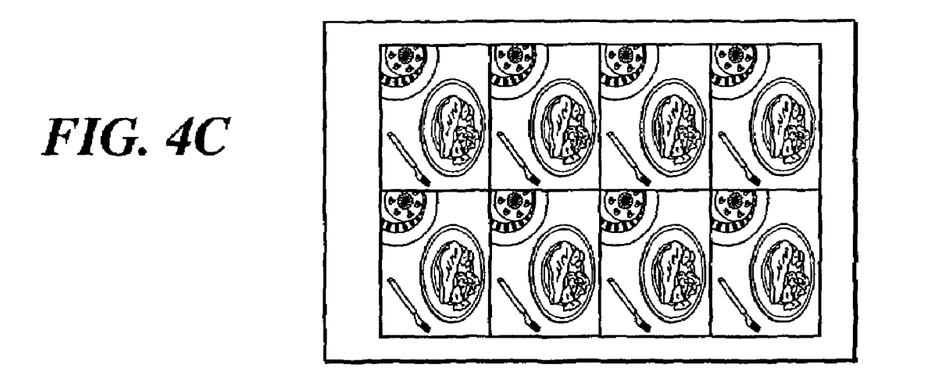
FIG. 4C shows a multi-pattern.

In the present embodiment, it is possible to select from three print patterns (print modes) as shown in FIG. 4 by operating the operating elements 4 of the digital camera 1. The first pattern is an edgeless pattern (FIG. 4A). This edgeless pattern is for printing an image over the entire print sheet. The second pattern is an edged pattern (FIG. 4B). This edged pattern is for printing an entire image in the area enclosed by the edges. The third pattern is for multiple printing (FIG. 4C). This multi-pattern makes eight prints of the same image on a sheet, each print being of the card size.

Figure 5:
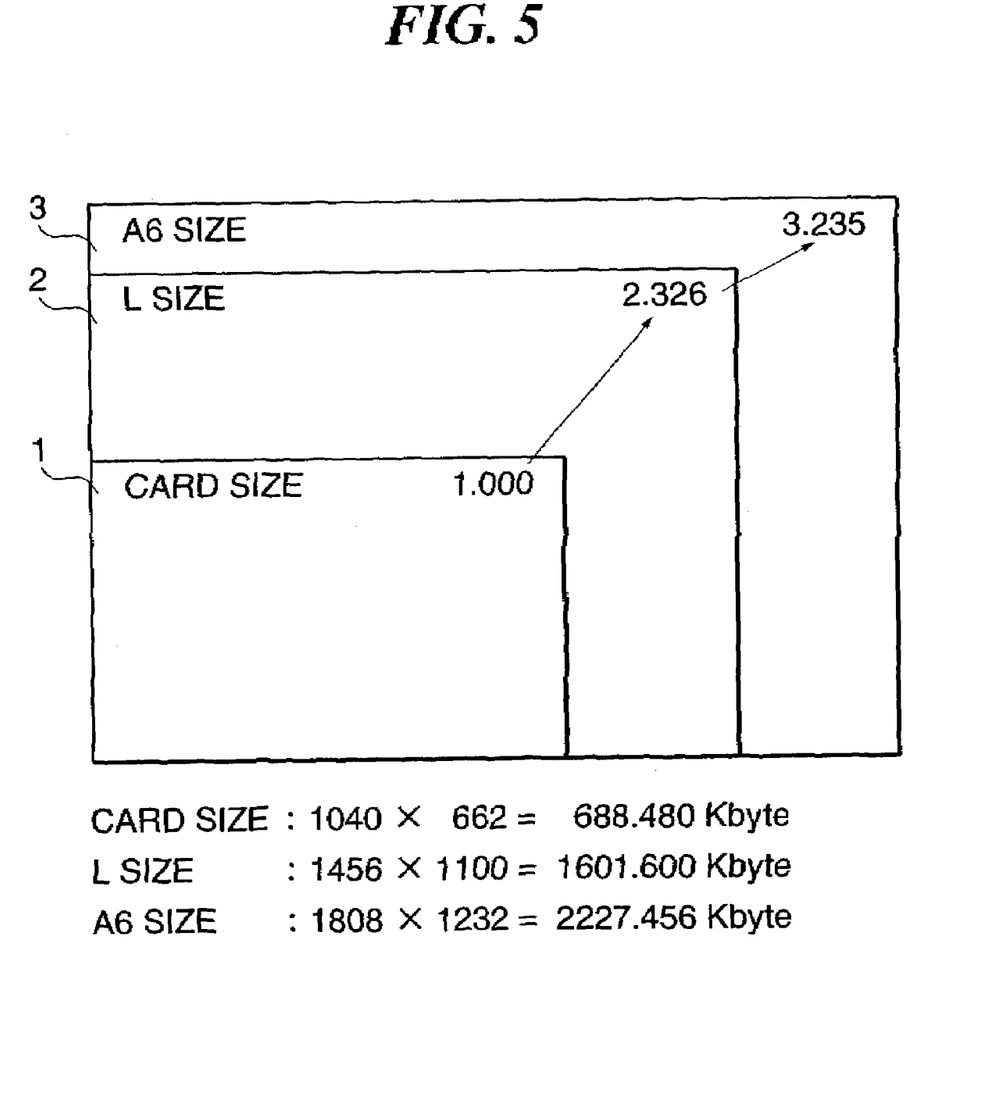
FIG. 5 is a diagram useful in explaining print data sizes in accordance with different print sheets according to the first embodiment.

Further, in the present embodiment, it is possible to select from three types of print sheets, as shown in FIG. 5, for the sublimation printer 3 by operating the operating elements 4 of the digital camera 1. In the figure, reference numeral 1 designates the card size of a vertical/horizontal size of 1040×662 pixels. Since the sublimation printer 3 allows gradation expression of 256 levels for a single pixel, the data amount required in printing is 1040×662×8 (bits)=1040×662 (bytes)=688.480 (Kbytes) for each of yellow, magenta, and cyan. In the figure, reference numeral 2 designates an L size of a vertical/horizontal size of 1456×1100 pixels. The data amount is 1456×1100×8 (bit)=1456×1100 (bytes)=1601.600 (Kbytes) for each of yellow, magenta, and cyan. In the figure, reference numeral 3 designates an A6 size of a vertical/horizontal size of 1808×1232 pixels. The data amount is 1808×1232×8 (bit)=1808×1232 (bytes)=2227.456 (Kbytes) for each of yellow, magenta, and cyan.

Regarding the data amount of each print sheet, if the card size designated by reference numeral 1 is 1.000, then the L size designated by reference numeral 2 is 2.326 times as large as the card size, and the A6 size designated by reference numeral 3 is 3.235 times as large as the card size. Thus, it will be understood that the larger the size of a print sheet, the larger the memory capacity of the SDRAM 24 required in image processing.

Next, the operation of the digital camera 1 that constitutes the printing system constructed as described above according to the present embodiment will be described with reference to FIGS. 1 to 10.

Figure 6A:
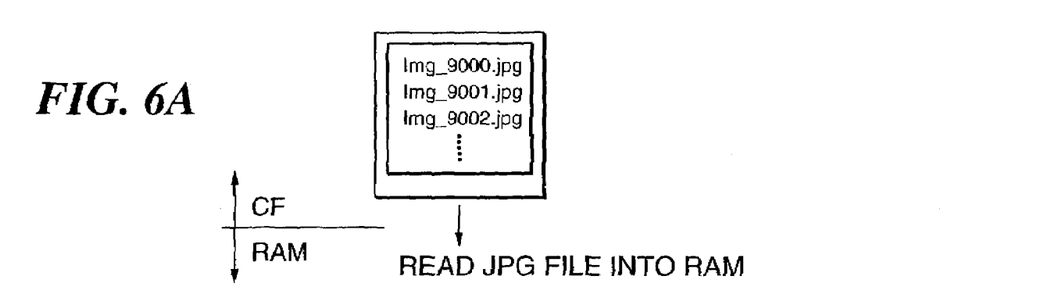
FIGS. 6A to 6E are diagrams useful in explaining a procedure of image processing of print data according to the first embodiment.
Figure 6B:
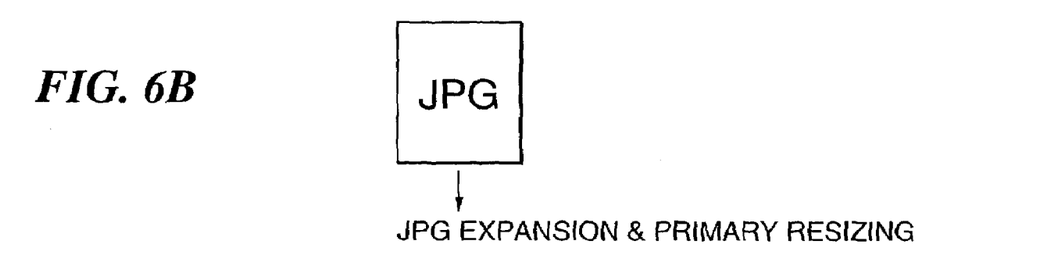
Figure 6C:
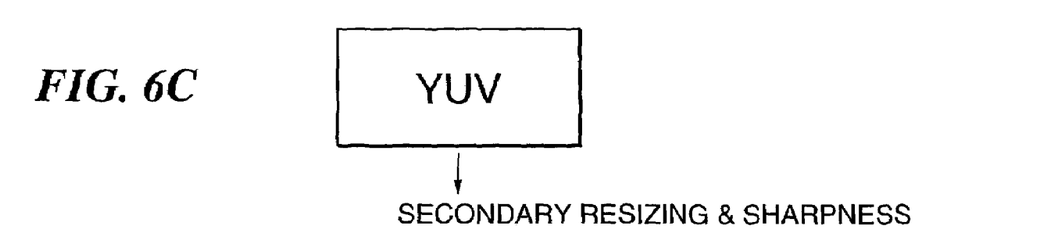
Figure 6D:
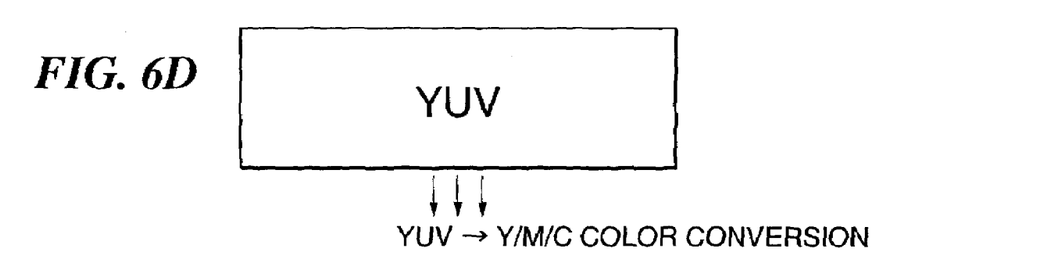
Figure 6E:
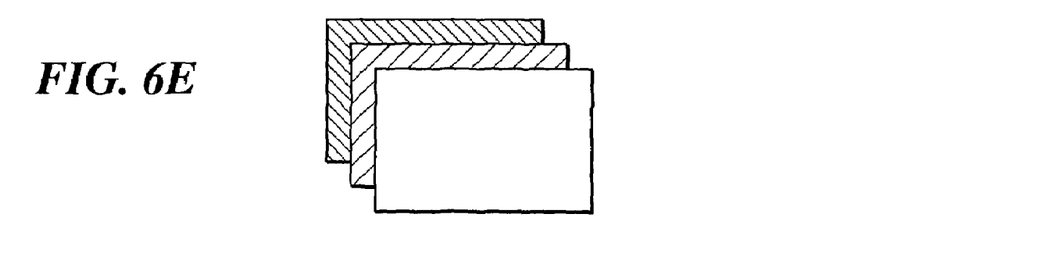

FIGS. 6A to 6E are diagrams showing the procedure of generating image data for printing according to the present embodiment. FIG. 6A shows a JPG file stored in the CF 25 of the digital camera 1. First, in FIG. 6B, the JPG file stored in the CF 25 is-read onto the SDRM (working memory) 24 of the digital camera 1. Next, in FIG. 6C, the JPG file in the working memory is transmitted to a JPG chip in the image processing engine 22 to be expanded, and then a primary resizing is performed on the expanded JPG file (for example, converted into 4 bit data). On this occasion, a YUV format is used as the image format, and the image data after the primary resizing is written onto the working memory. Further, in FIG. 6D, the image data after the primary resizing is read from the working memory and a secondary resizing is performed on the image data (for example, converted into 8 bit data), thus data in a desired YUV format (image data format) is obtained, the obtained data is written onto the working memory, and sharpness processing is performed on the image data. Finally, in FIG. 6E, image data for printing is generated for each color of yellow (Y), magenta (M), and cyan (C) from the image data in the YUV format.

During the procedure of generating image data for printing described above, reading and writing of data to and from the working memory are repeated a plurality of times. Data in these intermediary stages must be of a data size processible in the working memory at respective time points. For example, a memory area onto which data after the primary resizing is written must not overlap a memory area in which a JPG file is stored. As another example, after the secondary resizing, image data areas onto which respective data of yellow (Y), magenta (M), and cyan (C) are stored in the YUV format are generated such that the generated image data areas do not overlap each other in the memory.

Therefore, according to the present embodiment, the YUV format for image data after the primary resizing and the YUV format for image data after the secondary resizing are respectively selectable to allow adjusting the capacity of data that is written onto the working memory, and thus it is possible to avoid overlapping of working memory areas that are needed during processing of image data for printing.

The YUV format mentioned here is the ratio between the amount of luminance data (Y) and the amounts of color difference data (U, V), which represent image data. YUV 4:4:4, YUV 4:2:2, YUV 4:1:1, and the like are generally used formats. YUV 4:4:4 is an image data format in which the ratios of the luminance data, the color difference data of U, and the color difference data of V are equal. YUV 4:2:2 is an image data format in which the ratios are 4 for luminance data and 2 for each color difference data of U and V. YUV 4:1:1 is an image data format in which the ratios are 4 for luminance data and 1 for each color difference data of U and V.

Figure 7A:
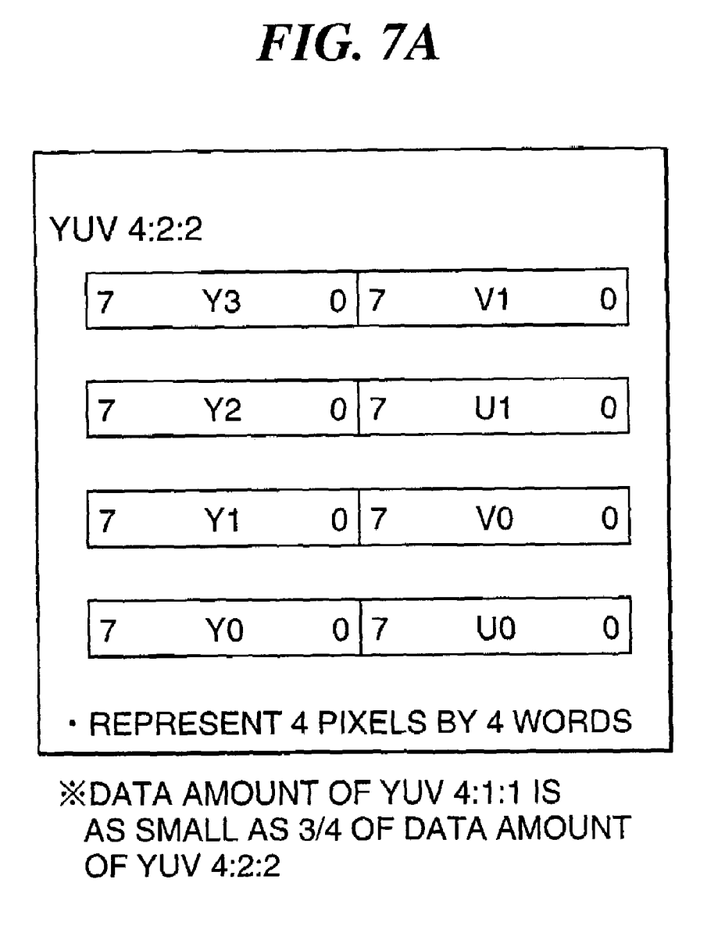
FIGS. 7A and 7B are diagrams useful in explaining the difference between data amounts of YUV 4:2:2 and YUV 4:1:1 according to the first embodiment.
Figure 7B:
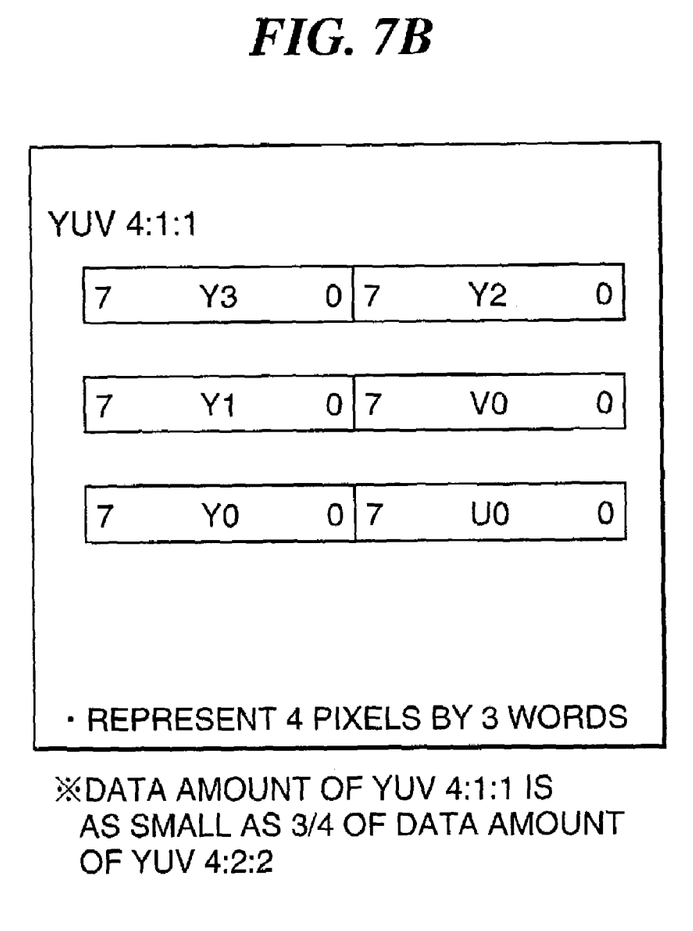

FIGS. 7A and 7B are diagrams showing the difference between the data amounts of YUV 4:2:2 and YUV 4:1:1 according to the present embodiment. YUV 4:2:2 requires data in four words for representing data of four pixels in the horizontal direction (luminance data of 8 bits for each pixel and each color difference data U and V of 8 bits obtained by averaging for each 2 pixels are sampled), while YUV 4:1:1 requires data in three words for representing data of four pixels in the horizontal direction (luminance data of 8 bits for each pixel and each color difference data U and V of 8 bits obtained by averaging for each 4 pixels are sampled). Accordingly, it will be understood that YUV 4:1:1 requires a data amount of only ¾ of that of YUV 4:2:2. If the data capacity of the working memory is insufficient, it is advantageous to use YUV 4:1:1.

Further, it will be understood from the forms of data packing of YUV 4:2:2 and YUV 4:1:1 that image data in YUV 4:2:2 can be processed in a unit of two pixels, while image data in YUV 4:1:1 can be processed only in a unit of four pixels. Thus, in performing resizing processing or the like, data size units of multiples of 2 can be handled for YUV 4:2:2, while only data size units of multiples of 4 can be handled for YUV 4:1:1. Accordingly, in view of the degree of freedom of image processing, YUV 4:2:2 is advantageous, which can handle smaller data size units and has a larger amount of color difference data.

Figure 8:
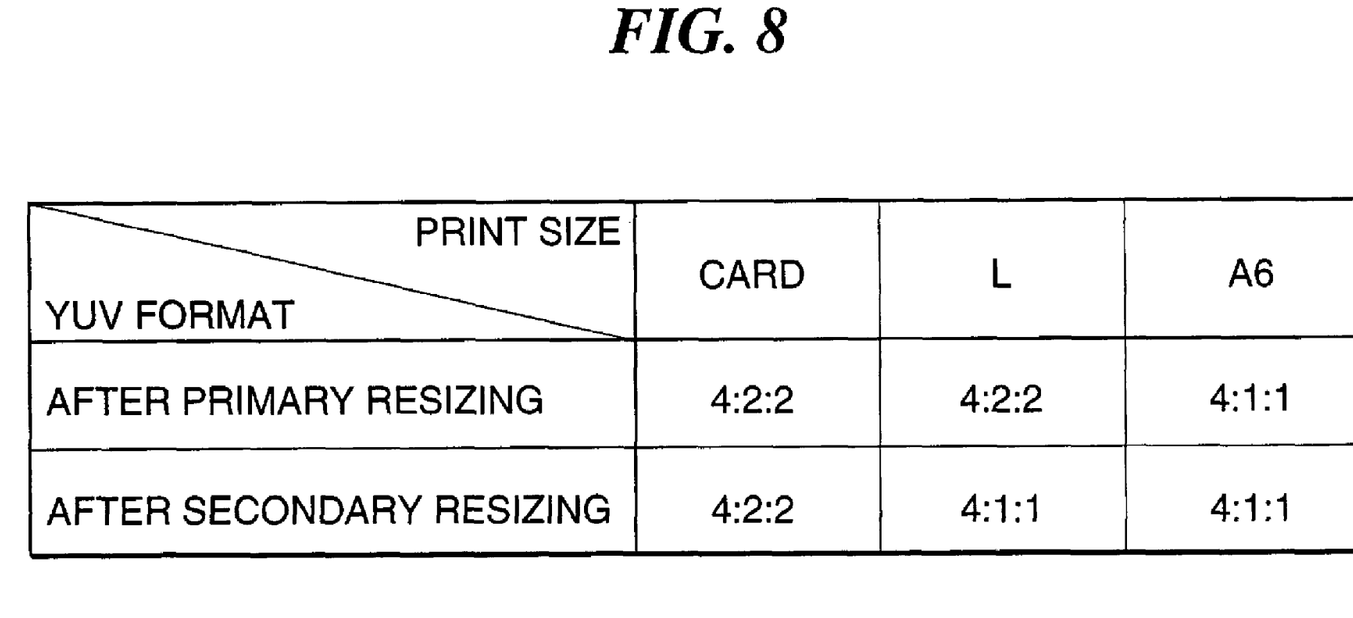
FIG. 8 is a diagram useful in explaining print image sizes and YUV formats in image processing according to the first embodiment.

Therefore, in the present embodiment, image processing of print data is flexibly performed in view of both the data amount and the data size that can be handled. Specifically, as shown in FIG. 8, the YUV data format to be applied after the primary resizing and the YUV data format to be applied after the secondary resizing are selected according to the print image size. In the case that the size of an image to be printed out is the card size, the amount of print image data is small, therefore the image data is handled in the format of YUV 4:2:2 both after the primary resizing and after the secondary resizing. In the case of the L size, of which the amount of print image data is larger than that of the card size, the image data is handled in the format of YUV 4:2:2 after the primary resizing, and in the format of YUV 4:1:1 after the secondary resizing. In the case of the A6 size, of which the amount of print image data is larger than that of the L size and larger than three times of that of the card size, the image data is handled in the format of YUV 4:1:1 both after the primary resizing and after the secondary resizing, because the format of YUV 4:1:1 requires a data amount smaller than that for the format of YUV 4:2:2.

Figure 9:
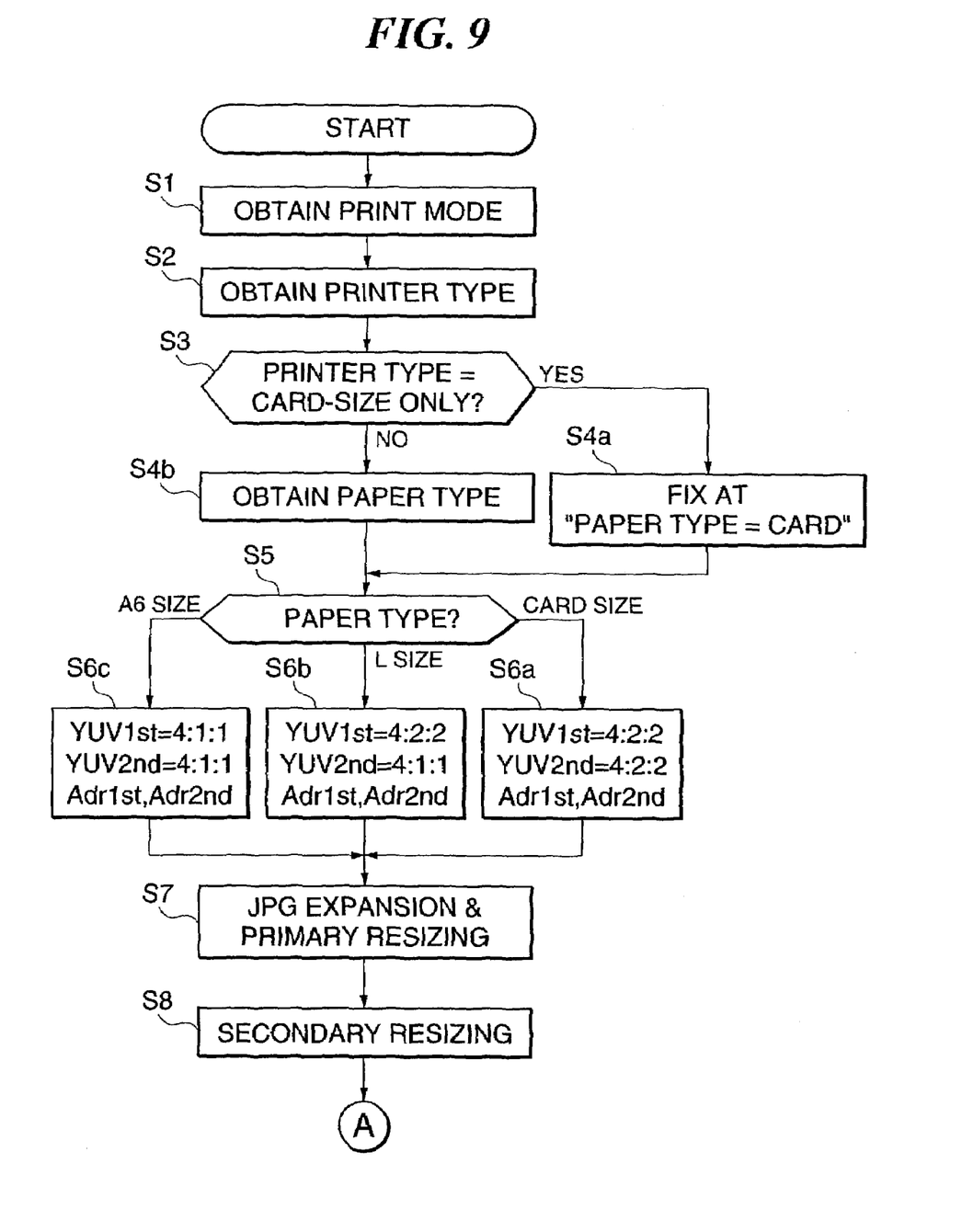
FIG. 9 is a flowchart showing a print image data process according to the first embodiment.
Figure 10:
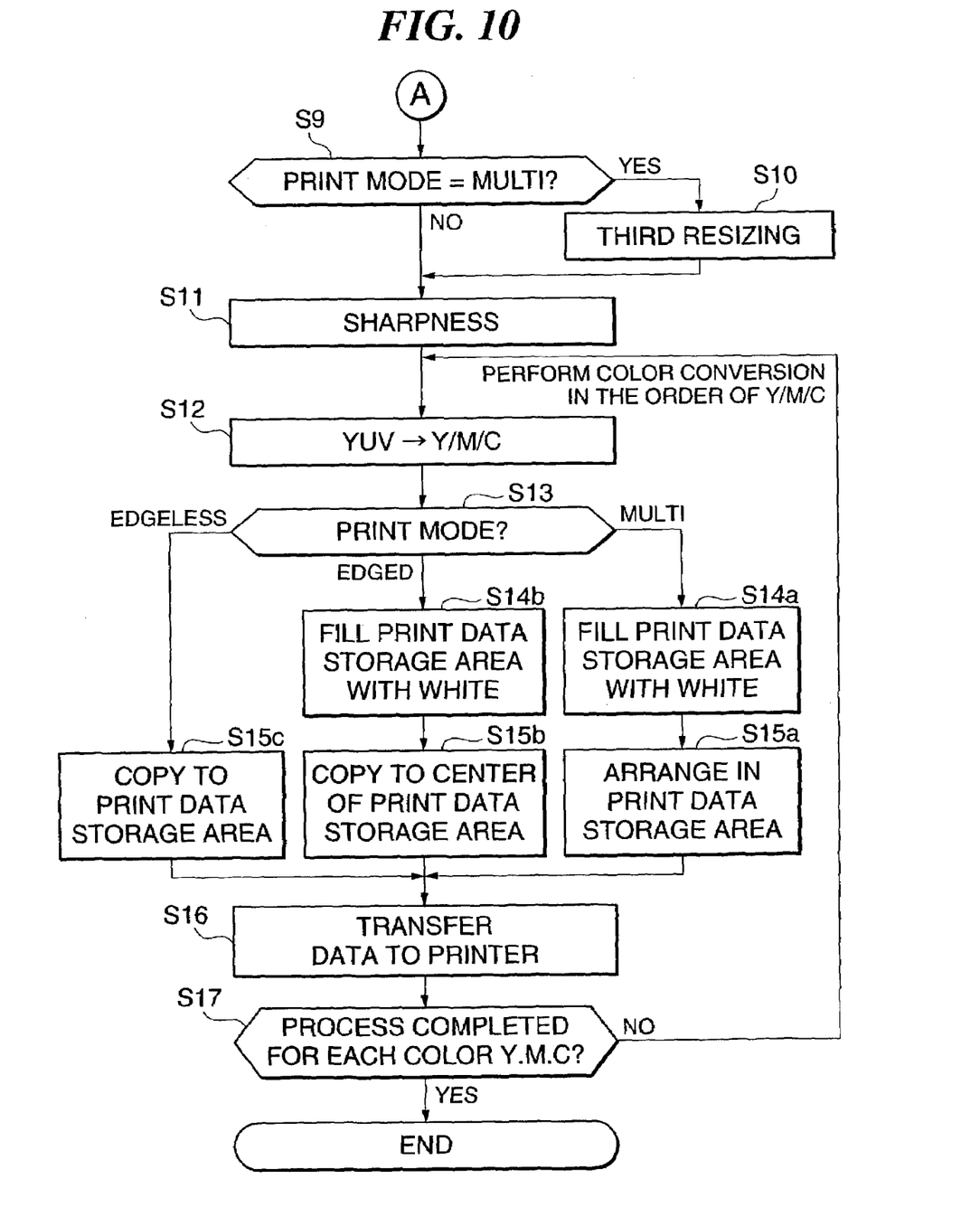
FIG. 10 is a flowchart showing a continued part of the flowchart of FIG. 9.

Next a print image data process according to the present embodiment will be described with reference to a flowchart in FIGS. 9 and 10. In the following description, a printer type that can print only the card size, and a printer type that can print the card size, L size, and A6 size are supported. The process of FIGS. 9 and 10 is executed by the CPU 21 of the digital camera 1 according to the program stored in the flash ROM 23.

First, the CPU 21 of the digital camera 1 obtains a printer mode according to a designation by a user using the operating elements 4 (step S1). As described above by referring to FIG. 4, the print mode (print pattern) is selectable from the edgeless pattern, the edged pattern, and the multi pattern. The CPU 21 obtains information as to which of the above described three print modes is designated. Next, the CPU 21 obtains a printer type according to a designation by the user using the operating elements 4 (step S2). As described before, in the present embodiment, a printer type that can print only the card size, and a printer type that can print the card size, L size, and A6 size are supported, and accordingly, the CPU 21 obtains information as to which of the above described printer type is designated.

Next, it is determined which printer type the printer type obtained in above described step S2 is (step S3). If it is determined that the printer type is a printer of the type that can print only the card size, then the paper type is fixed to the card size (step S4a). On the other hand, if it is determined that the printer type is a printer of the type that can print the card size, L size, and A6 size, then the CPU 21 obtains a paper type designated by the user using the operating elements 4 (step S4b). Next, it is determined which of the card size, L size, and A6 size the paper type is (step S5), and subsequent processing is designated according to the determined paper type of the card size, L size, or A6 size.

If the paper type is determined to be the card size, then the image data format of YUV 4:2:2 is designated to be applied both after the primary resizing and after the secondary resizing, and addresses in the working memory from which data are read after the primary resizing and after the secondary resizing are designated (step S6a). If the paper type is determined to be the L size, then the image data format of YUV 4:2:2 is designated to be applied after the primary resizing and the image data format of YUV 4:1:1 is designated to be applied after the secondary resizing, and addresses in the working memory from which data are read after the primary resizing and after the secondary resizing are designated (step S6b). If the paper type is determined to be the A6 size, then the image data format of YUV 4:1:1 is designated to be applied both after the primary resizing and after the secondary resizing, and addresses in the working memory from which data are read after the primary resizing and after the secondary resizing are designated (step S6c).

Next, JPG expansion and the primary resizing of image data to be printed are carried out, and then the data is written onto the working memory in a YUV format designated in the above described step S6a, S6b, or S6c (step S7). Next, the data having been written onto the working memory after the primary resizing is read, the secondary resizing is then carried out on the read data, and the resulting data is written onto the working memory in a YUV format designated in the above described step S6a, S6b, or S6c (step S8). Next, it is determined whether the print mode is set to the multi-pattern (step S9). If it is determined that the print mode is not set to the multi pattern, then the process jumps to step S11. If it is determined that the print mode is set to the multi-pattern, then a third resizing is carried out (step S10), and thereafter the process proceeds to step S11.

Next, sharpness processing is performed on the image data resized into the desired size (step S11). Then, yellow (Y) data is generated first, from the image data in the YUV data format (step S12). Thereafter, magenta (M) data and cyan (c) data are successively generated. That is, the process goes through the same routine three times. Next, the print mode is determined for carrying out fine adjustment and position adjustment of the print data (step S13).

If the print mode is determined to be the edgeless pattern, then data after color conversion from the YUV data is copied onto a print data storage area of the working memory after discarding data of several pixels in a peripheral portion of the data after color conversion (step S15c). If the print mode is determined to be the edged pattern, then the print data storage area of the working memory is filled with FFh (white) for a data amount corresponding to the print sheet (step S14b). Further, after discarding data of several pixels in the peripheral portion of the data after color conversion from the YUV data, the remaining data after color conversion is adjusted in position (position adjustment to obtain equal margins at top, bottom, left, and right edges on a white sheet), and is copied onto the above-mentioned print data storage area (step S15b). If the print mode is determined to be the multi pattern, then the print data storage area of the working memory is filled with FFh (white) for a data amount corresponding to the print sheet (step S14a). Further, after discarding data of several pixels in the peripheral portion of the data after color conversion from the YUV data, a predetermined sheet number of the same image of the data after color conversion ion are arranged in the above-mentioned print data storage area (step S15a).

After executing the processing in the above described step S15a, step S15b, or step S15c, the print data is transmitted to the sublimation printer 3 from the digital camera 1 through the dedicated cable 2 (step S16). Following the above described generation of the yellow (Y) data, the processing from the above step S12 to the above step S16 is repeated for each generation of magenta (M) data and cyan (C) data and, when the above described series of processing associated with all the colors of yellow (y) data, magenta (M) data, and cyan (C) data is completed (Yes in step S17), the process is terminated.

As described above, according to the present embodiment, the printing system is constructed such that the image pickup apparatus such as a digital camera or a digital video camera and the printer device such as a printer are directly connected with each other. In this printing system, in writing image data to the working memory after the primary resizing and the secondary resizing, the image data format is selectively changed according to the printout size of the image data. As a result, the printing system does not suffer from a shortage of the working memory during image processing of the image data for printing, and thus the memory provided in the image pickup apparatus can be effectively used. Thus, a printing system that has minimized costs and is very flexible can be realized.

Although in the present embodiment, the operation of converting image data from the JPG format to the YUV format process, shown in FIGS. 9 and 10, is carried out on the digital camera 1 side, alternatively this operation may be executed on the sublimation printer 3 side. In the latter case, the contents of processing are the same as those in FIGS. 9 and 10 except for the step S16, and a description of the processing is omitted.

Figure 11A:
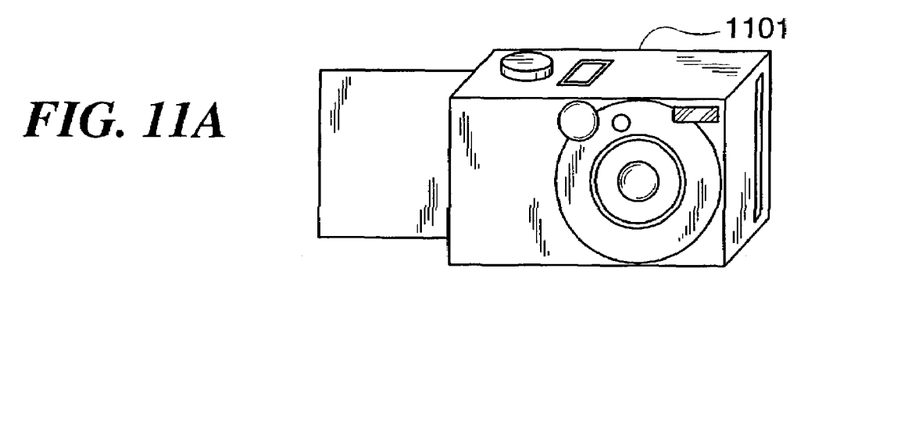
FIG. 11A is a perspective view showing the appearance of the digital camera.
Figure 11B:
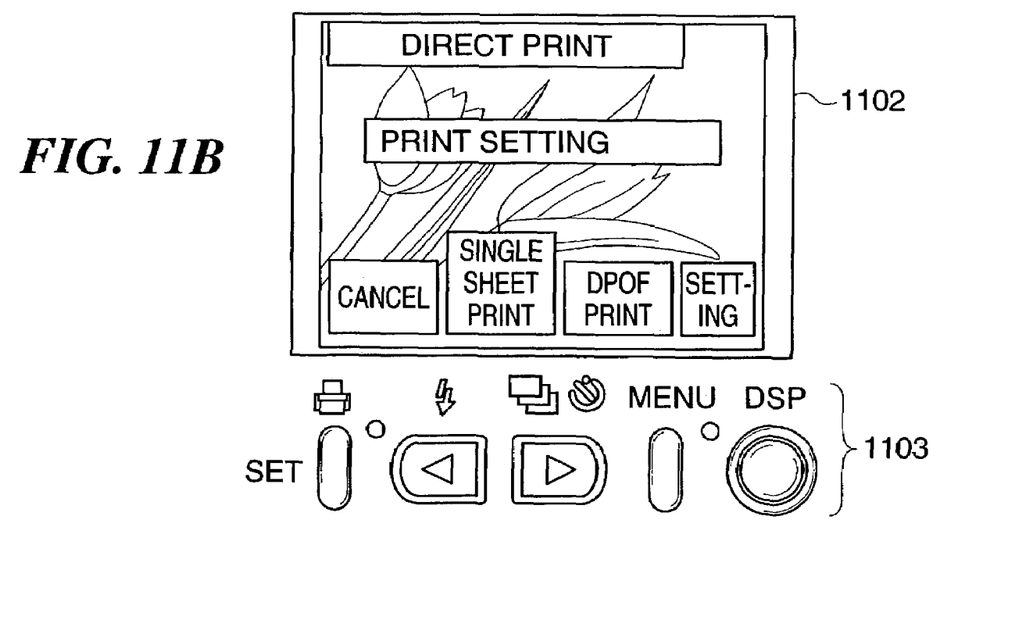
FIG. 11B is a diagram showing a liquid crystal screen and operating elements of the digital camera.

FIG. 11 is a perspective view showing the appearance of a digital camera having a built-in sublimation printer according to a second embodiment of the present invention. The digital camera 1101 is provided with a liquid crystal display screen 1102 and an operating element 1103. In the present embodiment, images that are picked up by the digital camera 1101, then stored in a recording medium such as a memory, and read out from the recording medium are subjected to image processing in the digital camera 1101 to be, converted into print data suitable for printing by a sublimation printer incorporated in the digital camera 1101, and then printed in colors by the sublimation printer.

The operation of the digital camera 1101 constructed as described above according to the present embodiment will be described below with reference to FIG. 11.

A user can select a print mode, a printer type, an image to be printed, a print frame size, the number of prints, and so on by operating elements 1003 of the digital camera 1101 shown in FIG. 11, and confirm the selected contents by the liquid crystal display screen 1102 of the digital camera 1101. The contents of image processing for generating print data are identical to the first embodiment described above, and description of the same is omitted.

As described above, according to the present embodiment, the printing system is constructed such that the image pickup apparatus such as a digital camera or a digital video camera and a printing device such as a printer are incorporated in one body. In this printing system, in writing image data to the working memory after the primary resizing and the secondary resizing, the image data format is selectively changed according to the printout size of the image data. As a result, the printing system does not suffer from a shortage of the working memory during image processing of the image data for printing, and thus the memory provided in the image pickup apparatus can be effectively used. Thus, a printing system that has minimized costs and is very flexible can be realized.

Although the above described first and second embodiments, a digital camera was employed, by way of example, as an image pickup apparatus that constitutes a printing system, the present invention is not limited to such a construction, and may also be applied to digital video cameras being used as an image pickup apparatus.

Further, although in the above described first and second embodiments, a sublimation thermal transfer print is used, by way of example, as a printer that constitutes a printing system, the present invention is not limited to such a construction, and may also be applied to various types of printers such as thermosensitive printers, electrostatic printers, inkjet printers, and electrophotographic printers, being used as a printer.

The present invention may either be applied to a system composed of a plurality of apparatuses (e.g. a host computer, interface equipment, a reader, and a printer) or to a single apparatus (e.g. a copying machine, a facsimile machine, or the like).

The present invention may either be applied to a system composed of a plurality of apparatuses or to a single apparatus.

It is to be understood that the object of any of the above described embodiments may also be accomplished by supplying a system or an apparatus with a storage medium in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the storage medium storing the program code constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, a ROM, and a download via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image processing apparatus comprising:
   a storage medium;
   an input unit adapted to input image data stored in said storage medium; and
   an image processing unit adapted to select a first data format or a second data format as an image data format of the image data to be converted according to a size in which the input image data is to be printed out and process the input image data in the selected image data format;
   wherein each of the first image format and the second image format has a ratio between a luminance data amount and color difference data amounts, and the ratio of the first image format is different from the ratio of the second image format.

2. The image processing apparatus according to claim 1, further comprising an image pickup apparatus that picks up an image of an object.

3. The image processing apparatus according to claim 1, further comprising a printer device that prints an image based on the image data processed by said image processing device.

4. The image processing apparatus according to claim 1,
   wherein the second image data format requires the color difference data amounts smaller than the color difference data amounts of the first image data format;
   wherein the image processing apparatus further comprises a setting unit adapted to set the size in which the input image data is to be printed out, and
   wherein said image processing unit selects the first image format if the size set by said setting unit is smaller than a predetermined size, and said image processing unit selects the second image format if the size set by said setting unit is not less than the predetermined size.

5. The image processing apparatus according to claim 1,
   wherein the luminance data amount comprises a luminance data amount (Y), the color difference data amounts comprise color difference data amounts (U, V), and the ratio comprises a ratio (Y:U:V) between the luminance data amount (Y) and color difference data amounts (U, V), and
   wherein the first image data format has the ratio (Y:U:V) of 4:2:2, and the second image data format has the ratio (Y:U:V) of 4:1:1.

6. An image processing apparatus comprising:
   a storage medium;
   an input device that inputs image data stored in said storage medium; and
   an image processing device that selects an image data format of the image data to be converted according to a size in which the input image data is to be printed out and processes the input image data in the selected image data format;
   wherein the image data format comprises one of a first image data format and a second image data format requiring a data amount smaller than a data amount of the first image data format;
   wherein said image processing device selects the first image data format when a first printout image size is selected, and selects the second image data format when a second printout image size is selected; and
   wherein the first image data format has a ratio (Y:U:V) between a luminance data amount (Y) and color difference data amounts (U, V) of 4:2:2, and the second image data format has a ratio (Y:U:V) of 4:1:1.

7. An image processing method comprising steps of:
   inputting image data stored in a storage medium;
   selecting a first data format or a second data format as an image data format of the image data to be converted according to a size in which the input image data is to be printed out; and
   processing the input image data in the selected image data format;
   wherein each of the first image format and the second image format has a ratio between a luminance data amount and color difference data amounts, and the ratio of the first image format is different from the ratio of the second image format.

8. The method according to claim 7,
   wherein the second image data format requires the color difference data amounts smaller than the color difference data amounts of the first image data format;
   wherein the method further comprises a setting step of setting the size in which the input image data is to be printed out, and
   wherein the first image format is selected if the size set in said setting step is smaller than a predetermined size, and the second image format is selected if the size set in said setting step is not less than the predetermined size.

9. The method according to claim 7,
   wherein the luminance data amount comprises a luminance data amount (Y), the color difference data amounts comprise color difference data amounts (U, V), and the ratio comprises a ratio (Y:U:V) between the luminance data amount (Y) and color difference data amounts (U, V), and
   wherein the first image data format has the ratio (Y:U:V) of 4:2:2, and the second image data format has the ratio (Y:U:V) of 4:1:1.

10. An image processing method comprising:
    an input step of inputting image data stored in a recording medium; and
    an image processing step of selecting an image data format of the image data to be converted according to a size in which the input image data is to be printed out and processing the input image data in the selected image data format;
    wherein the image data format comprises one of a first image data format and a second image data format requiring a data amount smaller than a data amount of the first image data format;
    wherein the first image data format is selected when a first printout image size is selected, and the second image data format is selected when a second printout image size is selected; and
    wherein the first image data format has a ratio (Y:U:V) between a luminance data amount (Y) and color difference data amounts (U, V) of 4:2:2, and the second image data format has a ratio (Y:U:V) of 4:1:1.

11. A computer-executable program stored in a computer readable medium for causing a computer to execute an image processing method comprising steps of:

inputting image data stored in a storage medium;
selecting a first data format or a second data format as an image data format of the image data to be converted according to a size in which the input image data is to be printed out; and
processing the input image data in the selected image data format;
wherein each of the first image format and the second image format has a ratio between a luminance data amount and color difference data amounts, and the ratio of the first image format is different from the ratio of the second image format.

12. The computer-executable program stored in a computer readable medium according to claim 11,
wherein the second image data format requires the color difference data amounts smaller than the color difference data amounts of the first image data format;
wherein the method further comprises a setting step of setting the size in which the input image data is to be printed out, and
wherein the first image format is selected if the size set in said setting step is smaller than a predetermined size, and the second image format is selected if the size set in said setting step is not less than the predetermined size.

13. The computer-executable program stored in a computer readable medium according to claim 11,
wherein the luminance data amount comprises a luminance data amount (Y), the color difference data amounts comprise color difference data amounts (U, V), and the ratio comprises a ratio (Y:U:V) between the luminance data amount (Y) and color difference data amounts (U, V), and
wherein the first image data format has the ratio (Y:U:V) of 4:2:2, and the second image data format has the ratio (Y:U:V) of 4:1:1.

14. A computer-executable program stored in a computer readable medium, for causing a computer to execute an image processing method comprising:
an input step of inputting image data stored in a recording medium; and
an image processing step of selecting an image data format of the image data to be converted according to a size in which the input image data is to be printed out and processing the input image data in the selected image data format;
wherein the image data format comprises one of a first image data format and a second image data format requiring a data amount smaller than a data amount of the first image data format;
wherein said image processing device selects the first image data format when a first printout image size is selected, and selects the second image data format when a second printout image size is selected; and
wherein the first image data format has a ratio (Y:U:V) between a luminance data amount (Y) and color difference data amounts (U, V) of 4:2:2, and the second image data format has a ratio (Y:U:V) of 4:1:1.

* * * * *